United States Patent [19]

Sugiura

[11] Patent Number: 5,206,846
[45] Date of Patent: Apr. 27, 1993

[54] SIGNAL DETECTOR HAVING A VIRTUAL DIVISION

[75] Inventor: Satoshi Sugiura, Tokorozawa, Japan

[73] Assignee: Pioneer Electronic Corporation, Tokyo, Japan

[21] Appl. No.: 627,273

[22] Filed: Dec. 14, 1990

[30] Foreign Application Priority Data

Jul. 25, 1990 [JP] Japan ............... 2-196709

[51] Int. Cl.⁵ ............................................. G11B 7/13
[52] U.S. Cl. ................................. 369/44.12; 369/44.41; 250/201.1
[58] Field of Search ............... 369/44.12, 44.11, 44.41, 369/44.42, 44.28, 44.27, 44.23, 32, 43, 54, 58; 250/201.8, 201.5, 201.1

[56] References Cited

U.S. PATENT DOCUMENTS

| | | | |
|---|---|---|---|
| 4,730,295 | 3/1988 | Bressers | 369/44.41 |
| 4,747,090 | 5/1988 | Yamashita et al. | 369/44.42 |
| 4,904,856 | 2/1990 | Nagahama et al. | 369/44.42 |
| 4,920,527 | 4/1990 | Maeda | 369/44.23 |
| 4,998,235 | 3/1991 | Ishibashi et al. | 369/44.41 |

Primary Examiner—Aristotelis Psitos
Assistant Examiner—Muhammad Edun
Attorney, Agent, or Firm—Sughrue, Mion, Zinn, Macpeak & Seas

[57] ABSTRACT

A signal detector, having a light receiving element, in which a plurality of electrodes are arranged opposite to the surface of the light receiving element through which light is received. The electrode opposite to the position of incidence of received light is cut off to form two electrode regions on either side of the electrode cut off and to thereby set a virtual division line. The need for the provision of a structural division line on the light receiving element used for focusing control is thereby eliminated. There is therefore no need for strict adjustment of the attachment position and, hence, no need for an error adjustment circuit to be separately provided.

14 Claims, 4 Drawing Sheets

SIGNAL DETECTOR HAVING A VIRTUAL DIVISION

BACKGROUND OF THE INVENTION

This invention relates to a signal detector used for an information recording/reproduction device and more particularly to a signal detector in which an element for detecting a signal is easily assembled.

A type of conventional signal detector has a semiconductor laser for emitting laser light, a beam splitter through which laser light from the semiconductor laser travels to an optical disk and which splits signal light reflected and diffracted by the optical disk, an objective lens for condensing and projecting the laser light transmitted through the beam splitter to an information recording surface of the optical disk, a biprism for separating the signal light split by the beam splitter into two beams, and a photodetector device which has a plurality of photodiodes for receiving the two beams of signal light separated by the biprism and which detects an error in focusing on the optical disk.

The operation of the conventional signal detector thus constructed will be described below.

Laser light emitted from the semiconductor laser is projected to the information recording surface of the optical disk by the condensing effect of the optical system. The projected laser light is reflected and diffracted by the information recording surface of the optical disk to form signal light. This signal light is separated into two beams of light by the biprism, and these two beams of light are received by the photodiodes of the photodetector device bisectionally arranged.

Defocus detection is effected based on the Foucault method using signals output from the photodiodes receiving the light to obtain a focus error signal.

It is thereby possible to constantly maintain the distance between the objective lens and the information recording surface of the optical disk.

The signal detector in accordance with the prior art, however, entails a problem in that the photodiodes of the photodetector device and the biprism must be attached with a high accuracy while moving and adjusting the attached positions so that the beams of signal light condensed and projected at the time of focusing are correctly condensed to the photodiode division lines. Also, in a case where attachment adjustment is not effected, it is necessary to separately provide an error correction circuit.

SUMMARY OF THE INVENTION

It is therefore an object of the present invention to provide a signal detector which is capable of effecting position adjustment optimized at the time of focusing without actually moving and adjusting the attached position of the photodetector device, and which requires no additional error correction circuit.

According to the present invention, there is provided a signal detector for optically detecting a signal from an information recording medium onto which an information is recorded or from which said information is reproduced, which comprises: at least one light receiving element for receiving light from said information recording medium which is irradiated with light for recording or reproduction, said light receiving element having a light receiving surface for receiving the light from said information recording medium; and a plurality of electrodes arranged in positions opposite to said light receiving surface, information recording/reproduction being effected based on a detection signal output from said light receiving element, connection for one of said electrodes opposite to a point on said light receiving surface at which the light from said information recording medium is incident upon said light receiving surface being cut to separate said plurality of electrodes into two divided electrode regions on the opposite sides of said disconnected electrode with respect to the cut electrode, focus control being effected based on detection signals output from the two electrode regions. In the light receiving element, a plurality of electrodes are arranged opposite to the surface of the light receiving element through which light is received, and the electrode opposite to the position of incidence of the received light is cut off to form two electrode regions on either side of the electrode thus cut off and to set a virtual division line. The need for the provision of a structural division line on the light receiving element used for focusing control is thereby eliminated. There is therefore is no need for strict adjustment of the attachment position and, hence, no need for an error adjustment circuit separately provided for such adjustment.

Further objects, features and aspects of this invention will be understood from the following detailed description of the preferred embodiments of this invention with reference to the drawings.

DESCRIPTION OF THE PREFERRED EMBODIMENT

A signal detector in accordance with an embodiment of the present invention will be described below with reference to the accompanying drawings.

In order to gain a full understanding of the nature and utility of the present invention, a brief consideration of a special conventional signal detector will be first presented below with reference to FIGS. 6 and 7 principally for the purpose of comparison with the present invention.

Figure 6:
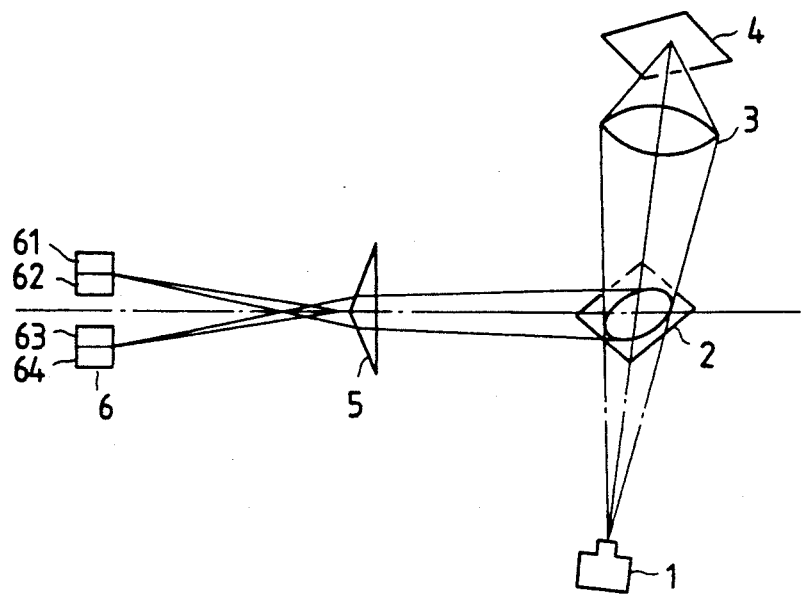
FIG. 6 is a schematic diagram of a conventional signal detector.

Referring to FIGS. 6 and 7, the conventional signal detector has a semiconductor laser 1 for emitting laser light, a beam splitter 2 through which laser light from the semiconductor laser 1 travels to an optical disk 4 and which splits signal light reflected and diffracted by the optical disk 4, an objective lens 3 for condensing and projecting the laser light transmitted through the beam splitter 2 onto an information recording surface of the optical disk 4, a biprism 5 for separating the signal light split by the beam splitter 2 into two beams, and a photodetector device 6 which has photodiodes 61 to 64 for receiving the two beams of signal light separated by the biprism 5 and which detects an error in focusing on the optical disk 4.

Next, the operation of the conventional signal detector thus constructed will be described below. Laser light emitted from the semiconductor laser 1 travels through the beam splitter 2 and is projected to the information recording surface of the optical disk 4 by the condensing effect of the objective lens 3. The projected laser light is reflected and diffracted to form signal light by the information recording surface of the optical disk 4. This signal light is split by the beam splitter 2 through the objective lens 3. The signal light split thereby is separated into two beams of light by the biprism 5, and these two beams of light are received by the photodiodes 61 to 64 of the photodetector device 6 bisectionally arranged.

If signals output from the photodiodes 61 to 64 receiving these beams of light are represented by $S_{61}$, $S_{62}$, $S_{63}$, and $S_{64}$, focus detection is effected based on the Foucault method using the output signals $S_{61}$, $S_{62}$, $S_{63}$, and $S_{64}$. That is, a calculation of $(S_{61}+S_{64})-(S_{62}+S_{63})$ is effected by a computation section (not shown), and a focus error signal is obtained from the result of this calculation.

Figure 7A:
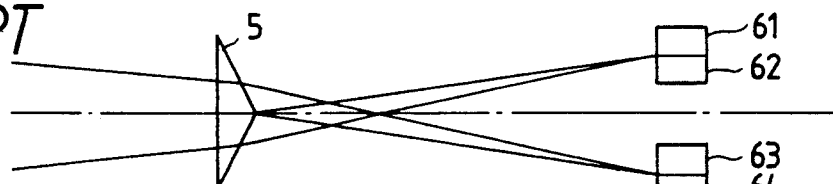
FIGS. 7(A) through 7(C) is a diagram of details of the photodiode arrangement of the prior art.

In the case of a focused state shown in FIG. 7(A), the value of the focus error signal is zero.

Figure 7B:
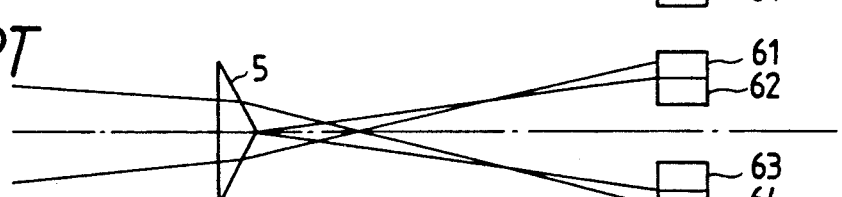

In the case of a defocused state shown in FIG. 7(B), where the optical disk 4 is more remote than the focal point of the objective lens 3, the two beams of separated signal light are respectively incident upon the outer photodiodes 61 and 64, so that the focus signal has a positive value.

Figure 7C:
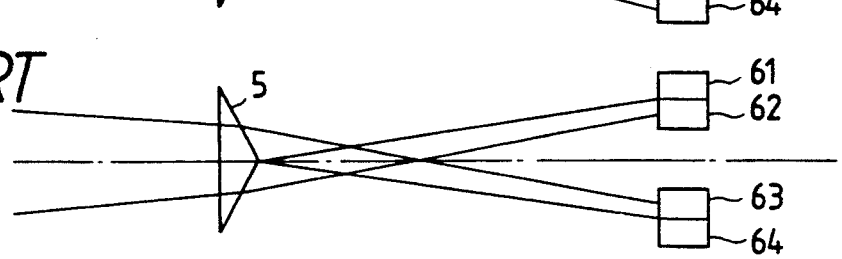

In the case of another defocused state shown in FIG. 7(C), where the optical disk 4 is closer than the focal point of the objective lens 3, the two beams of separated signal light are respectively incident upon the inner photodiodes 62 and 63, so that the focus signal has a negative value.

It is possible to constantly maintain the distance between the objective lens 3 and the information recording surface of the optical disk 4 based on the focus error signal detected in this way.

In order to implement the above method, the four photodiodes 61 to 64 and the biprism 5 must be assembled at their correct positions. After these members are assembled, it is very troublesome to adjust the positional relationship between the members. This defect can be eliminated by this invention.

Figure 1:
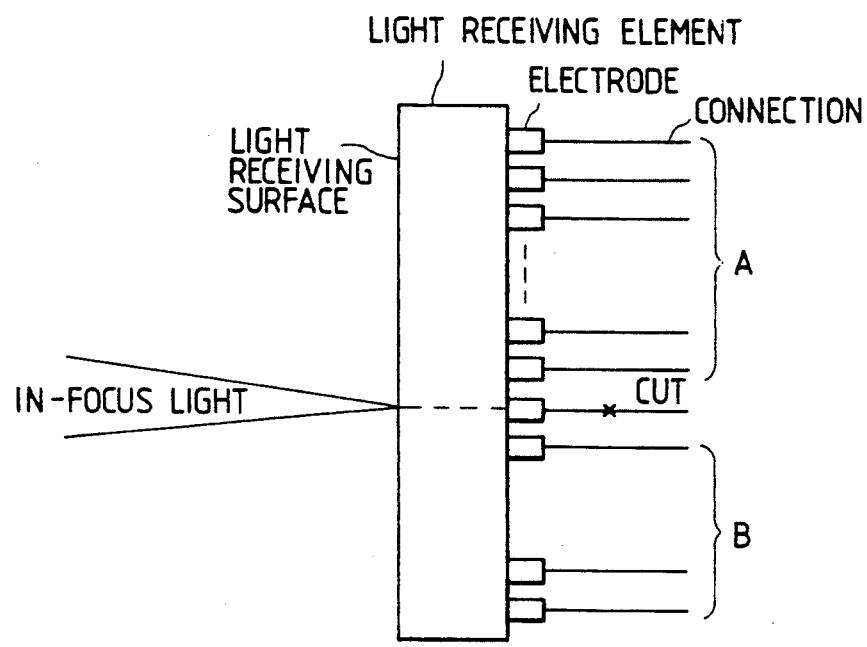
FIG. 1 is a diagram of the principle of the present invention.

FIG. 1 shows the principle of the present invention. In FIG. 1, a signal detector comprises at least one light receiving element for receiving light from an information recording medium on which various categories of information are recorded and which is irradiated with light for recording or reproduction. The light receiving element has a light receiving surface for receiving the light from the information recording medium and a plurality of electrodes arranged in positions opposite to the light receiving surface. Information recording/reproduction is performed based on a detection signal output from the light receiving element. Connection for one of the electrodes opposite to a point on the light receiving surface at which the light from the information recording medium is incident on the light receiving surface is cut to separate the plurality of electrodes with respect to two divided electrode regions or groups (A, B) on the opposite sides of the disconnected electrode.

Focusing control is effected based on detection signals output from the two electrode regions thus formed.

Figure 2:
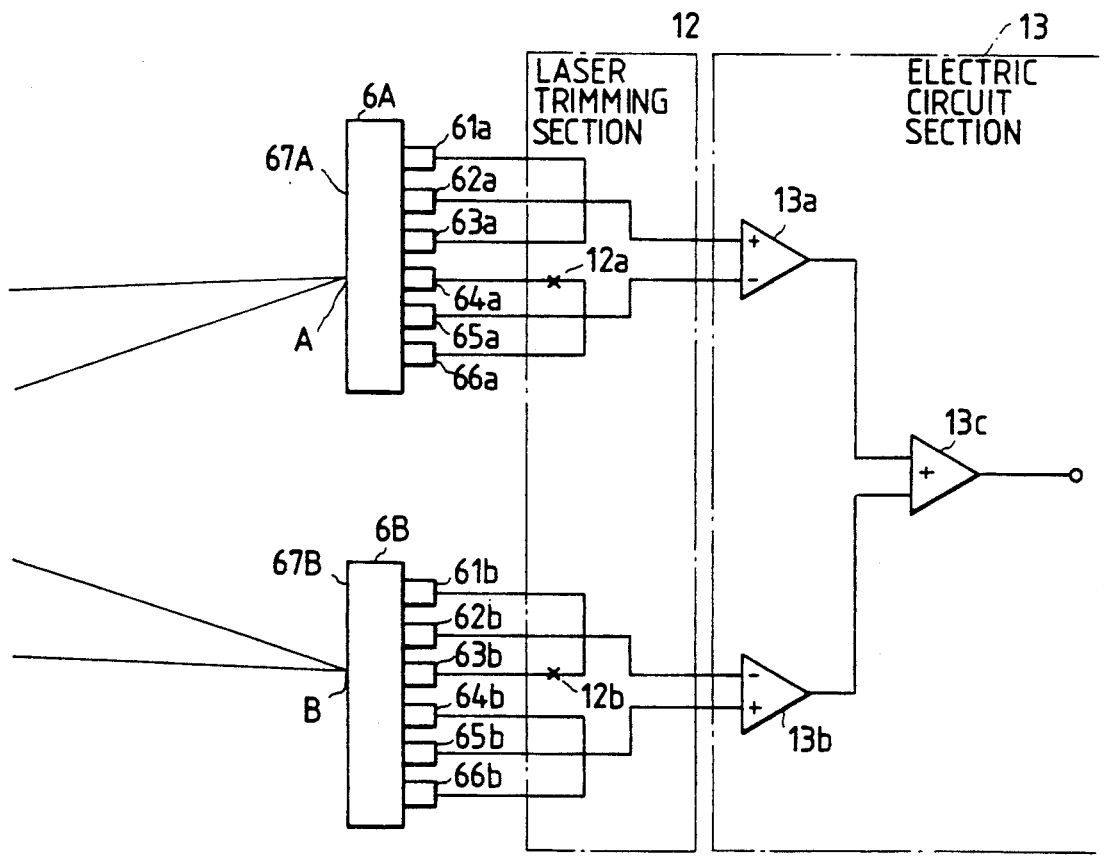
FIG. 2 is a diagram of an essential portion of an embodiment of the present invention.

An embodiment of the present invention will be described below with reference to FIGS. 2 through 4. FIG. 2 is a diagram of an essential portion of the embodiment of the present invention, FIG. 3 is a plan view of the semiconductor substrate of the embodiment, and FIG. 4 is an enlarged cross-sectional view taken along the line A—A of FIG. 3.

Figure 3:
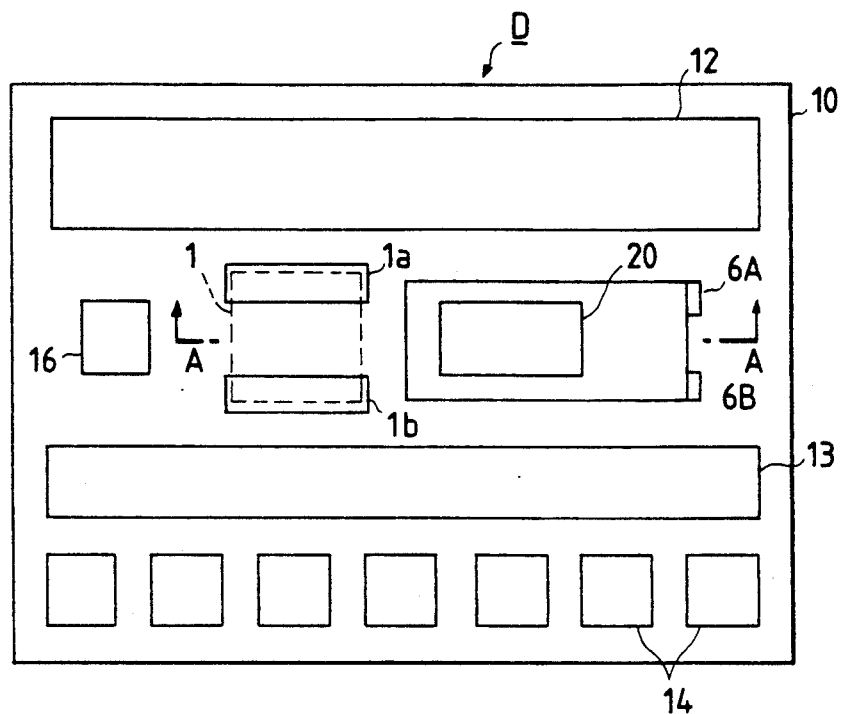
FIG. 3 is a plan view of the semiconductor substrate of the embodiment shown in FIG. 2.
Figure 4:
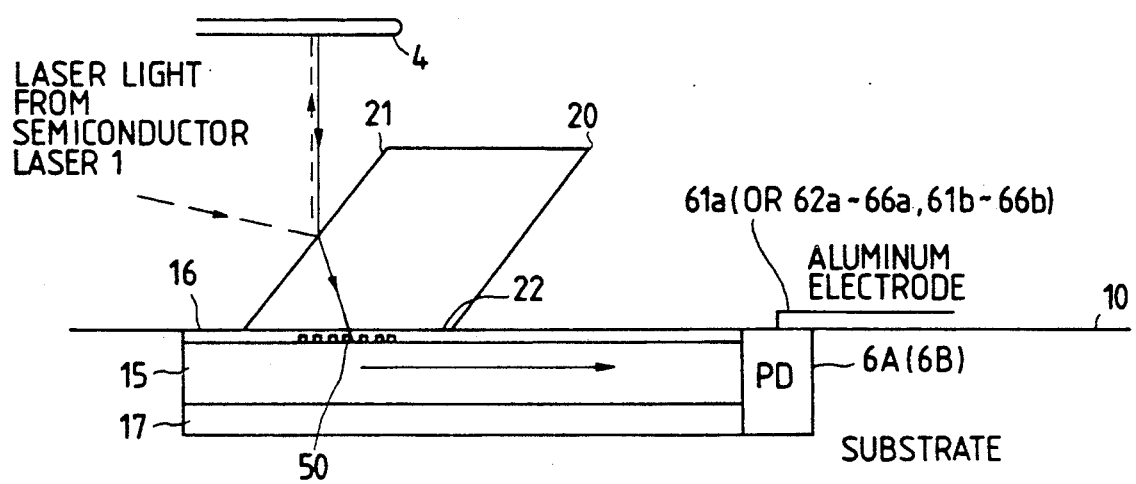
FIG. 4 is an enlarged cross-sectional view taken along the line A—A of FIG. 3.

Referring to FIGS. 2 through 4, a signal detector D in accordance with the embodiment has an optical separator 20 and a diffraction grating 50, a pair of photodiodes 6A and 6B, and a laser trimming section 12. The optical separator 20 is placed on a semiconductor substrate 10 to reflect laser light from a semiconductor laser 1 by its side surface 21 to make the reflected light travel to an optical disk 4. Also, the light diffracted and reflected by the optical disk 4 is incident upon the side surface 21 of the optical separator 20 to emerge through another side surface 22 of the same. The diffraction grating 50 is formed between a clad layer 16 and an optical waveguide layer 15 on the semiconductor substrate 10 to separate the signal light emergent from the side surface 22 of the optical separator 20 into two beams and to introduce the same into the optical waveguide layer 17. The photodiodes 6A and 6B are formed at an end surface of the optical waveguide layer 17 to receive the two beams of signal light through signal receiving surfaces 67A and 67B. The photodiodes 6A and 6B output signals corresponding to the received signal light through two arrays of electrodes each consisting of six electrodes 61a to 66a or 61b to 66b positioned opposite to the light receiving surface 67A or 67B. The laser trimming section 12 effects laser trimming by selecting connection lines from the electrodes 61a to 66a, and 61b to 66b of the photodiodes 6A and 6B.

The six electrodes 61a to 66a, or 61b to 66b of each photodiode 6A or 6B are grouped into two regions, and the group of electrodes 61a to 63a or 61b to 63b and the group of electrodes 64a to 66a or 64b to 66b are respectively connected in the laser trimming section 12.

Elements or components other than the laser trimming section 12 are also formed on the semiconductor substrate 10, including attachment lands 1a and 1b on which the semiconductor layer 1 is connected and mounted, an electric circuit section 13 for controlling the output from the semiconductor laser 1 and for calculation using signals output from the photodiodes 6A and 6B, and bonding pads 14 used for wire bonding connection to an external unit (not shown).

The adjustment operation of the detector thusconstructed in accordance with the embodiment of the present invention will be described below.

First, laser light emitted from the semiconductor laser 1 is reflected by the optical separator 20 on the side of the separator closest to the semiconductor laser 1 relative to the optical path towards disk 4. This reflection light is diffracted and reflected by the information recording surface of the optical disk 4 and is thereby changed into a signal light. This signal light is incident upon the side surface 21 of the optical separator 20, passes through this surface, and is emergent through the side surface 22. This emergent signal light is separated into two beams by the diffraction grating 50 and each of the two beams of light separated is received by the photodiode 6A or 6B. When photons of the light received are incident upon the substrate of the photodiode 6A and 6B, electrons in the substrate are excited and a current is thereby output through the electrode located in the vicinity of the incidence point.

In a case where signal light thus obtained is received by the photodiodes 6A and 6B as shown in FIG. 2 when the irradiation light is focused on the optical disk 4, connection lines from the electrodes 64a and 63b opposite to the points A and B on the light receiving surfaces 67A and 67B of the photodiodes 6A and 6B are cut off by the laser trimming section 12. By this connection line cutting, virtual photodiode division lines are set at the points A and B of the photodiodes 6A and 6B, respectively.

When the photodiode division lines are set at the points A and B, adders 13a, 13b, and 13c of the electric circuit 13 operate for calculation based on the Foucault method as described below. That is, if signals output from the electrodes 61a to 66a, and 61b to 66b are $S_{61a}$ to $S_{66a}$, and $S61b$ to $S\ 66b$, calculation of $(S_{61a}+S_{62a}+S_{63a}+S_{64b}+S_{65b}+S_{66b})-(S_{65a}+S_{66a}+S_{61b}+S_{62b})$ is effected. If the focus detection signal obtained from the result of this calculation is zero, a focused state is detected. If the focus detection signal has a positive value, a state in which the optical disk 4 is more remote is detected, or if the focus detection signal has a negative value, a state in which the optical disk is closer is detected.

In a case where an ideal attachment state is previously established as shown in FIG. 5 (A), and where signal light obtained when the optical system is focused is incident upon the point on the light receiving surface 67A of the photodiode 6A opposite to the intermediate point between the electrodes 63a and 64a, the output from the adder 13a is zero, there is therefore no need for cutting any connection line by the laser trimming section, and a virtual photodiode division line is set at this signal light incidence point.

Figure 5A:
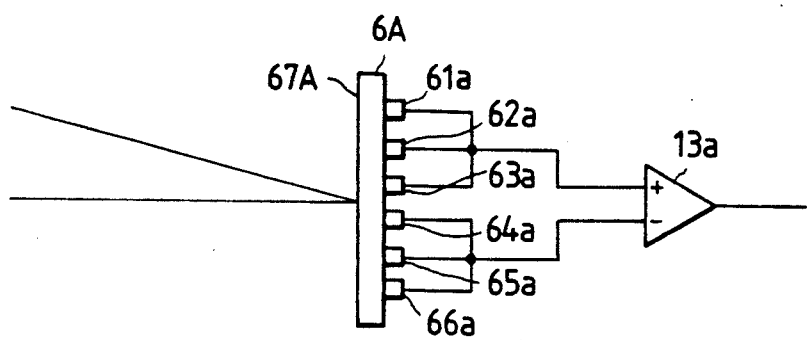
FIGS. 5(A) through 5(D) is a diagram of another example of the adjusting operation in accordance with the embodiment of the present invention.
Figure 5B:
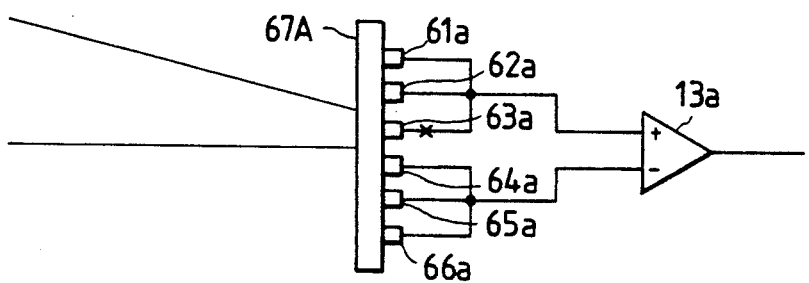

In the case of a state shown in FIG. 5(B), the output from the adder 13a has a positive value, laser trimming is effected by cutting the connection line from the electrode 63a, and a virtual photodiode division line is set at the point on the light receiving surface 67A of the photodiode 6A opposite to the electrode 63a.

Figure 5C:
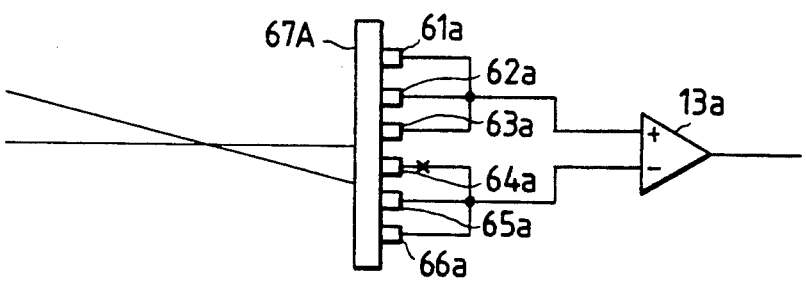
Figure 5D:
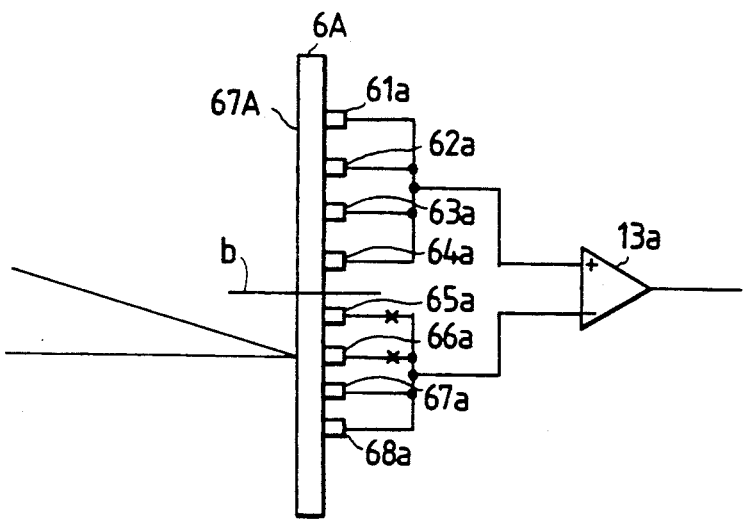

In the case of a state shown in FIG. 5(C), the output from the adder 13a has a negative value, laser trimming is effected by cutting the connection line from the electrode 64a, and a virtual photodiode division line is set at the point on the light receiving surface 67A of the photodiode 6A opposite to the electrode 64a.

In the above-described embodiment, six electrodes are arranged for one photodiode. However, the number of electrodes may be freely selected so long as it is not smaller than three. Specifically, the adjustment sensitivity can be improved if the number of electrodes is increased or if the intervals between the electrodes are reduced.

As shown in FIG. 5 (D), in the case where each divided group of electrodes has, for example, four electrodes 61a to 64a or 65a to 68a and where the light is incidint at a point opposite to an electrode 66a deviated over the electrode 65a from a boundary between two groups each having four electrodes which are connected to one another, connection is cut with respect to the two electrodes 65a, 66a.

The intervals between the electrodes may be set to be smaller than the minimum diameter of the spot of light incident upon the light receiving surface of each light receiving element to improve the accuracy with which the virtual division line is adjusted.

The embodiment has been described with respect to an example of two-dimensional adjustment. However, the present invention can also be applied to three-dimensional adjustment of photodiodes of a discrete pickup.

In accordance with the present invention, as described above, a plurality of electrodes are arranged opposite to the surface of the light receiving element through which light is received, and the electrode opposite to the position of incidence of the received light is cut off to form two electrode regions on the opposite sides of the electrode cut off, thereby setting a virtual division line. The need for the provision of a structural division line on the light receiving element used for focusing control is thereby eliminated. Therefore there is no need for strict adjustment of the attachment position and, hence, no need for an error adjustment circuit separately provided for adjustment.

What is claimed is:

1. A signal detector for optically detecting a signal from an information recording medium onto which information is recorded or from which said information is reproduced, the detector comprising:
   at least one light receiving element means for receiving light from said information recording medium which is irradiated with light for recording or reproduction, said light receiving element means having a light receiving surface for receiving the light from said information recording medium;
   a plurality of electrodes arranged in positions opposite to said light receiving surface; and
   connection means for omitting at least one electrode of said plurality of electrodes, said one electrode being opposite to a point on said light receiving surface at which the light from said information recording medium is incident upon said light receiving surface so as to separate said plurality of electrodes into two divided electrode regions on either side of said electrode thus omitted for adjusting the boundary of the divided electrode regions and the light receiving element means and for respectively connecting signals output from the two electrode regions.

2. A signal detector according to claim 1, wherein said plurality of electrodes of said light receiving element are previously grouped into two divided regions and a plurality of electrodes in each divided region thereby formed are respectively connected, and wherein if light reflected from said information recording medium, in a state wherein an optical system, connected to the detector, is focused, is incident upon the light receiving surface of said light receiving element at a position other than a boundary between the divided regions, said connection means omitting each of the electrodes from the electrode opposite to the point in which the light is incident on the light receiving surface to the electrode corresponding to the divided region boundary.

3. A signal detector according to claim 1, wherein the light from said information recording medium is separated into two beams, and two light receiving elements are provided for respectively receiving the beams of light thereby separated.

4. A signal detector according to claim 1, wherein said omitted electrode is omitted by said connection means in a state wherein the light for irradiation of the information recording medium is focused by an optical system connected to the detector.

5. A signal detector according to claim 1, wherein the intervals between said plurality of electrodes are smaller than a minimum diameter of the spot of light incident upon the light receiving surface of the light receiving element.

6. A signal detector according to claim 1, wherein said connection means is a laser trimming section formed on a semiconductor substrate.

7. An error signal detector for use in a recording/reproducing apparatus, wherein the apparatus transmits a beam of light on a recording medium, the beam of light being reflected and diffracted from the recording medium toward the error signal detector, the detector comprising:

at least one light receiving element comprising:
a light receiving surface that receives the beam of light from the recording medium; and
a plurality of electrodes, positioned across one surface of said light receiving element, and grouped into at least two regions, that output electrical signals in response to light incident on said light receiving surface;

a trimming section that receives the electrical signals output from said electrodes, and respectively connects together the electrical outputs from the electrode region to produce first and second terminal outputs, wherein said trimming section receives an electrical output from at least one virtual divider electrode, which is an electrode on said light receiving element that produces an electrical signal in response to an adjustment light beam output by the recording/reproducing apparatus and reflected from the recording medium, whereby in producing the terminal outputs, said trimming section omits any electrical output associated with the virtual divider electrode for adjusting the boundary of the divided electrode regions and the light receiving element;

a circuit section that receives the first and second terminal outputs and produces an error signal representing the difference between the terminal outputs; and wherein the recording/reproducing apparatus controls an operation external to the detector based on the error signal thus produced.

8. The error signal detector of claim 7, wherein the operation controlled by the recording/reproducing apparatus is a focus servo system operation.

9. The error signal detector of claim 7, wherein the operation controlled by the recording/reproducing apparatus is a tracking servo system operation.

10. The error signal detector of claim 7, wherein the detector comprises two of said light receiving elements that each receive one of two beams of light split by a prism contained in the recording/reproducing apparatus.

11. A method of producing an error signal for use in a recording/reproducing apparatus, wherein the apparatus transmits a beam of light on a recording medium, the beam of light being reflected and diffracted from the recording medium, the method comprising the steps of:

receiving the beam of light from the recording medium on at least one light receiving element having a plurality of electrodes positioned across one surface of the light receiving element and grouped into at least two regions;

producing output electrical signals from the electrodes in response to light incident on said light receiving surface;

connecting together the electrical outputs from the electrodes to produce first and second terminal outputs;

receiving an electrical output from at least one virtual divider electrode, which is an electrode on said light receiving element that produces an electrical signal in response to an adjustment light beam output by the recording/reproducing apparatus and reflected from the recording medium, and omitting any electrical output associated with the virtual divider electrode in producing the terminal outputs for adjusting the boundary of the divided electrode regions and the light receiving element; and producing an error signal representing the difference between the terminal outputs, wherein the recording/reproducing apparatus controls an operation external to the detector based on the error signal thus produced.

12. The method of producing an error signal of claim 11, wherein the operation controlled by the recording/reproducing apparatus is a focus servo system operation.

13. The method of producing an error signal of claim 11, wherein the operation controlled by the recording/reproducing apparatus is a tracking servo system operation.

14. The method of producing an error signal of claim 11, further comprising the step of generating two beams of light split by a prism contained in the recording/reproducing apparatus and respectively receiving said beams of light using two light receiving elements in said step of receiving the beam of light from the recording medium.

* * * * *